US012535100B2

(12) United States Patent
Sano

(10) Patent No.: US 12,535,100 B2
(45) Date of Patent: Jan. 27, 2026

(54) HALF THRUST BEARING

(71) Applicant: DAIDO METAL COMPANY LTD., Nagoya (JP)

(72) Inventor: Seiji Sano, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 86 days.

(21) Appl. No.: 18/424,937

(22) Filed: Jan. 29, 2024

(65) Prior Publication Data

US 2024/0255019 A1 Aug. 1, 2024

(30) Foreign Application Priority Data

Jan. 31, 2023 (JP) ................. 2023-012639

(51) Int. Cl.
*F16C 9/02* (2006.01)
*F16C 33/04* (2006.01)

(52) U.S. Cl.
CPC .............. *F16C 9/02* (2013.01); *F16C 33/046* (2013.01)

(58) Field of Classification Search
CPC .......... F16C 9/02; F16C 17/04; F16C 17/045; F16C 17/047; F16C 17/10; F16C 17/102; F16C 17/107; F16C 33/046; F16C 33/1065; F16C 33/107; F16C 33/1075
See application file for complete search history.

(56) References Cited

U.S. PATENT DOCUMENTS

| 9,982,709 | B2 * | 5/2018 | Tanaka | ............... F16C 9/02 |
| 2014/0233874 | A1 * | 8/2014 | Tanaka | ............... F16C 17/04 384/294 |
| 2020/0132115 | A1 * | 4/2020 | Berger | ............... F16C 33/1075 |
| 2020/0200218 | A1 * | 6/2020 | Arasaki | ............... F16C 33/1075 |
| 2022/0307548 | A1 * | 9/2022 | Yamada | ............... F16C 9/02 |

FOREIGN PATENT DOCUMENTS

JP 2001-323928 A 11/2001
JP 2017-172607 A 9/2017

* cited by examiner

*Primary Examiner* — Alan B Waits
(74) *Attorney, Agent, or Firm* — Harness, Dickey & Pierce, P.L.C.

(57) ABSTRACT

In a half thrust bearing for a crankshaft, a slide surface includes at least two oil grooves extending in a radial direction, pad surfaces located on both circumferential sides of each oil groove, a first inclined surface formed on a forward side of the oil groove in a rotation direction of the crankshaft, and a second inclined surface formed on a backward side of the oil groove in the rotation direction. Each of the first and second inclined surfaces has a circumferential length which varies along the radial direction and includes a ridge portion at a radial position where the circumferential length is minimum. The axial thickness of each of the first and second inclined surfaces is maximum at the ridge portion in the radial direction and become smaller from the ridge portion toward a radially inner end and toward a radially outer end.

6 Claims, 6 Drawing Sheets

A-A SECTION

B-B SECTION

C-C SECTION

PRIOR ART

HALF THRUST BEARING

BACKGROUND OF THE INVENTION

(1) Field of the Invention

The present invention relates to a semi-annularly shaped half thrust bearing having a slide surface for receiving an axial force of a crankshaft of an internal combustion engine.

(2) Description of Related Art

A crankshaft of an internal combustion engine is rotatably supported at a journal portion thereof by a cylinder block lower portion of the internal combustion engine via a main bearing configured by combining a pair of half bearings into a cylindrical shape. One or both of the pair of half bearings are used in combination with a half thrust bearing for receiving an axial force of the crankshaft. The half thrust bearing is provided on one or both of two end faces of the half bearing that face in an axial direction.

The half thrust bearing receives an axial force generated in the axial direction of the crankshaft. That is to say, the half thrust bearing is arranged for the purpose of bearing the axial force input to the crankshaft at such a time when the crankshaft and a transmission are connected by a clutch.

As described above, a crankshaft of an internal combustion engine is borne at a journal portion thereof by a cylinder block lower portion of the internal combustion engine via a main bearing consisting of a pair of half bearings. Lubricating oil is fed into a lubricating oil groove formed along the inner circumferential surface of the main bearing from an oil gallery in a cylinder block wall through a through-hole in a wall of the main bearing. In this way, the lubricating oil is supplied into the lubricating oil groove of the main bearing, and then supplied to a half thrust bearing.

Meanwhile, in recent years, crankshafts have been reduced in diameter due to weight saving of internal combustion engines, and thus decrease in rigidity as compared with conventional crankshafts. Accordingly, bending easily occurs in a crankshaft during running of an internal combustion engine, and vibration of the crankshaft tends to increase. Therefore, a slide surface of a half thrust bearing directly contacts a thrust collar surface of the crankshaft, which makes it easier for damage such as seizure to occur. As a measure against this, there has been suggested a technique of providing a plurality of pad portions on the slide surface of the half thrust bearing, and providing an oil groove and an inclined surface between the pad portions, thereby forming a high-pressure oil film in a clearance between the inclined surface and the thrust collar surface during running of the internal combustion engine, and making it difficult for the slide surface of the half thrust bearing to directly contact the thrust collar surface of the crankshaft (e.g. see JP 2017-172607 A).

There has been also suggested a technique of forming circumferentially extending narrow grooves on a slide surface of a half thrust bearing so as to be successively arranged in a radial direction, thereby supplying oil to the entire slide surface to prevent the seizure of the slide surface (e.g., see JP 2001-323928 A).

BRIEF SUMMARY OF THE INVENTION

However, even if the technique of JP 2017-172607 A or JP 2001-323928 A is employed, the slide surface of the half thrust bearing and the thrust collar surface of the crankshaft come into direct contact with each other when vibration of the crankshaft becomes great as described above, and therefore it has been difficult to prevent occurrence of seizure of the half thrust bearing.

Therefore, an object of the present invention is to provide a half thrust bearing for a crankshaft of an internal combustion engine that can restrain the occurrence of seizure during running of the internal combustion engine.

According to the present invention, there is provided a semi-annularly shaped half thrust bearing for receiving axial force of a crankshaft of an internal combustion engine, the half thrust bearing comprising a slide surface for receiving the axial force and a back surface on an opposite side thereto, and defining an axial direction, a circumferential direction, and a radial direction, wherein the slide surface comprises:

at least two oil grooves each radially extending from a radially inner end to a radially outer end of the slide surface with a constant width;

a plurality of pad surfaces located on both sides of each oil groove in the circumferential direction, and having an axial thickness from the back surface to the pad surface that is constant;

at least two first inclined surfaces, each first inclined surface being formed between the oil groove and the pad surface so as to be located on a forward side of the oil groove in a rotation direction of the crankshaft, and having an axial thickness from the back surface to the first inclined surface that is gradually smaller in the circumferential direction from a pad surface side toward an oil groove side; and at least two second inclined surfaces, each second inclined surface being formed between the oil groove and the pad surface so as to be located on a backward side of the oil groove in the rotation direction of the crankshaft, and having an axial thickness from the back surface to the second inclined surface that is gradually smaller in the circumferential direction from the pad surface side toward the oil groove side, wherein each of the first inclined surfaces and the second inclined surfaces has a circumferential length which varies along the radial direction, and comprises a ridge portion which extends circumferentially at a radial position where the circumferential length is minimum, wherein the circumferential length of each of the first inclined surfaces and the second inclined surfaces is formed so as to become greater from the ridge portion toward the radially inner end along the radial direction and become greater from the ridge portion toward the radially outer end along the radial direction, the axial thickness of each of the first inclined surfaces and the second inclined surfaces is formed so as to be maximum at the ridge portion in the radial direction, become smaller from the ridge portion toward the radially inner end, and become smaller from the ridge portion toward the radially outer end, and the ridge portions of the first inclined surface and the second inclined surface located on both sides of each oil groove in the circumferential direction are formed at the same radial position on an outer side relative to a center line of the half thrust bearing in the radial direction.

According to the present invention, in each of the first and second inclined surfaces, a circumferential length (L3) of the ridge portion may be between 50% and 90% of a circumferential length (L1) at the radially inner end.

According to the present invention, in each of the first and second inclined surfaces, an axial depth (D3) from the pad surface to the ridge portion at a position adjacent to the oil groove may be between 50% and 90% of an axial depth (D1) from the pad surface to the radially inner end at a position adjacent to the oil groove.

Further, according to the present invention, the first inclined surface and the second inclined surface on both sides of the oil groove in the circumferential direction may be formed symmetrically with respect to a center line of the oil groove in a width direction thereof.

DESCRIPTION OF THE EMBODIMENTS

Hereinafter, an embodiment of the present invention and its advantages will be described in detail with reference to the accompanying schematic drawings. Note that the embodiment shown below is merely illustrative and does not limit the present invention.
(Overall Configuration of Bearing Device)

Figure 1:
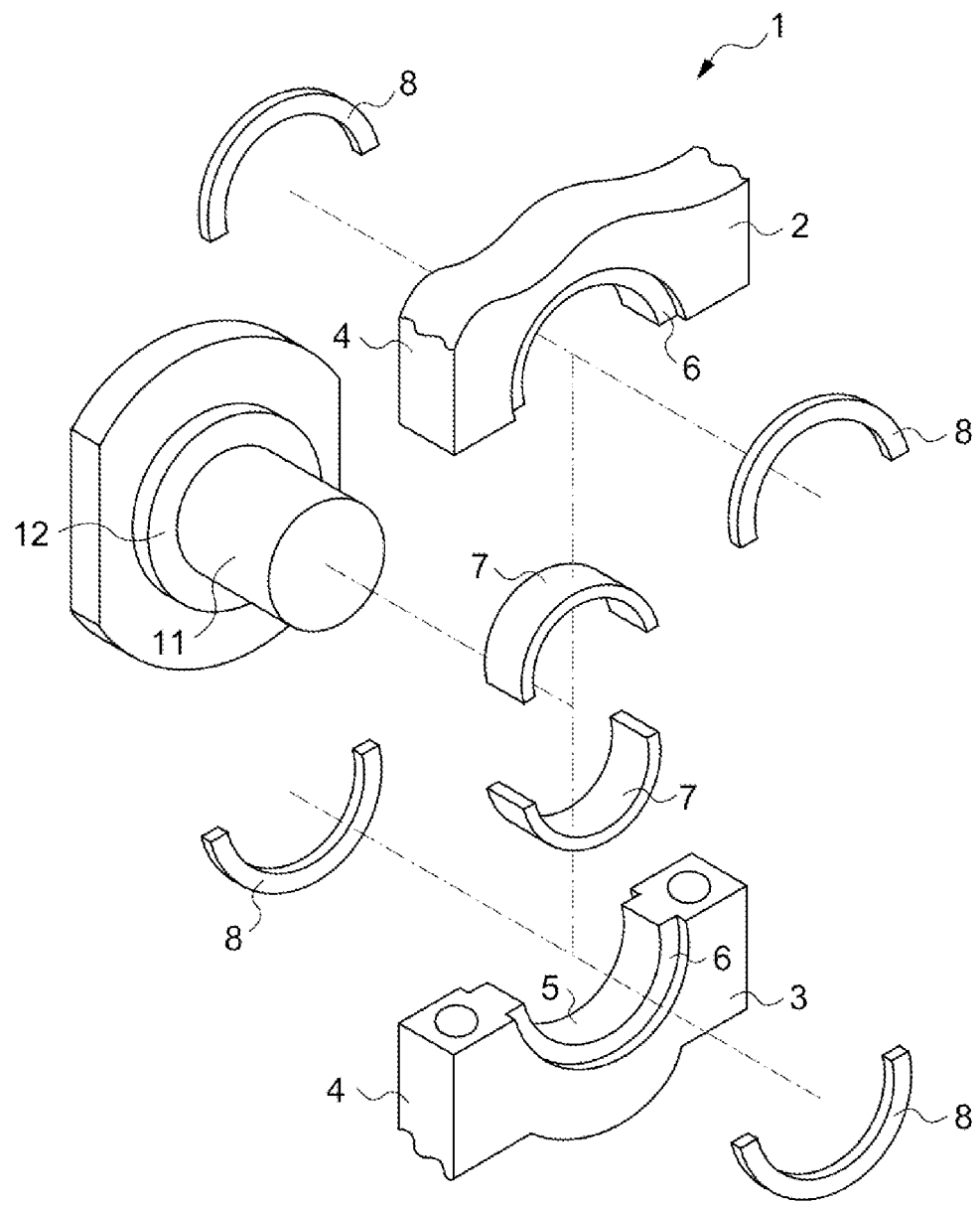
FIG. 1 is an exploded perspective view of a bearing device.
Figure 7:
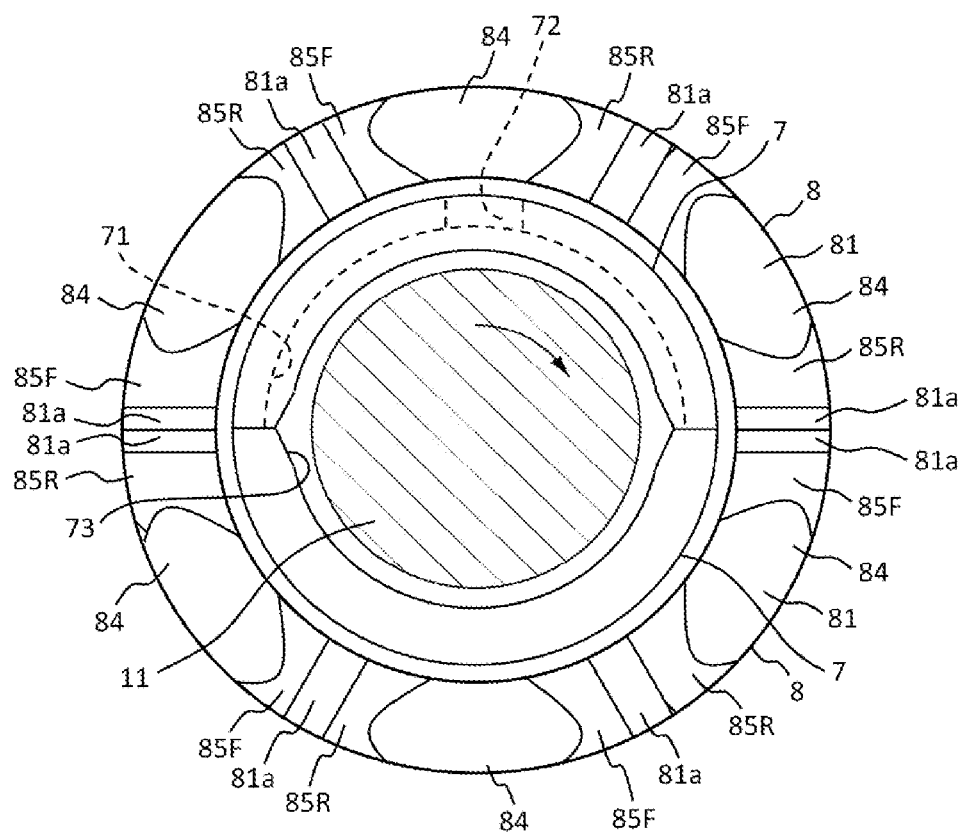
FIG. 7 is a front view of a bearing device including a half bearing and a thrust bearing.
Figure 8:
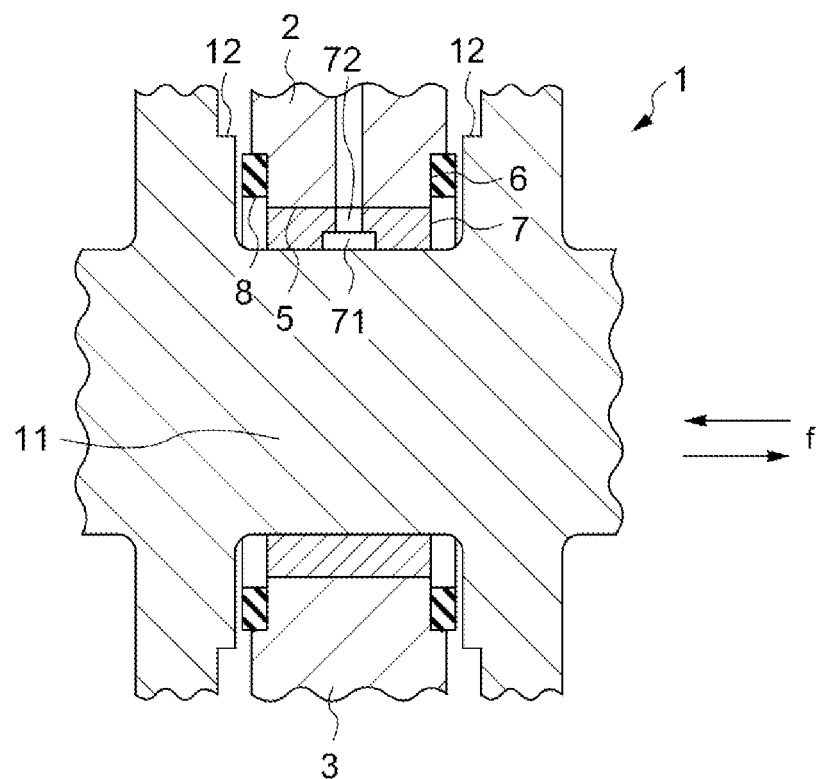
FIG. 8 is a sectional view of the bearing device in FIG. 7.

Firstly, the overall configuration of a bearing device 1 including a half thrust bearing 8 of the present invention will be described by use of FIGS. 1, 7, and 8. As illustrated in FIGS. 1, 7, and 8, a bearing hole (holding hole) 5 which is a circular hole pierced between both side surfaces is formed in a bearing housing 4 configured by mounting a bearing cap 3 to the lower portion of a cylinder block 2, and accept seats 6, 6 which are annularly shaped recesses are formed at peripheral edges on the side surfaces of the bearing hole 5. Half bearings 7, 7 which rotatably bear a journal portion 11 of a crankshaft are combined into a cylindrical shape and fitted into the bearing hole 5. Half thrust bearings 8, 8 which receive an axial force f (see FIG. 8) via a thrust collar 12 of the crankshaft are combined into an annular shape and fitted into the accept seats 6, 6.

As illustrated in FIG. 7, in the half bearing 7 constituting a main bearing, a lubricating oil groove 71 is formed in the inner circumferential surface of the half bearing 7 on the cylinder block 2 side (upper side), and a through-hole 72 pierced in an outer circumferential surface from the lubricating oil groove 71 is formed. In addition, the lubricating oil groove 71 can also be formed in each of both upper and lower half bearings. Moreover, in the half bearing 7, crush reliefs 73 are formed at both circumferential ends and adjacent to the abutment surfaces of the half bearings 7.

In the bearing device 1, oil having been pressurized and discharged from an oil pump (not illustrated) is supplied to the lubricating oil groove 71 in the inner circumferential surface of the half bearing 7 through the through-hole 72 pierced in the wall of the half bearing 7 from an internal oil path of the cylinder block 2. A part of the oil supplied into the lubricating oil groove 71 is supplied to the inner circumferential surface of the half bearing 7, a part of the oil enters an opening of a non-illustrated internal oil path in the crankshaft on the surface of the journal portion 11 and is fed to a crankpin side, and a part of the oil flows out to the outside from both ends of the half bearing 7, 7 in the width direction through a clearance between the surface of the crush relief 73 of each of a pair of the half bearings 7, 7 constituting the main bearing and the surface of the journal portion 11 of the crankshaft. The oil which has flowed out to the outside from both ends of each of the half bearing 7 in the width direction mainly flows into a clearance surrounded by the surface of the thrust collar 12 of the crankshaft, the accept seat 6 of the housing, the inside-diameter surface of the half thrust bearing 8, and the surface of the journal portion 11 of the crankshaft, and then flows into an oil groove 81a in a slide surface 81 of the half thrust bearing 8. The oil which has flowed into the oil groove 81a flows to a first inclined surface 85F of the slide surface 81 of the half thrust bearing 8, and a pad surface 84 in this order, following the surface of the rotating thrust collar 12.

Generally, a thrust bearing bears an axial force f from the crankshaft by generation of pressure in the oil between the slide surface 81 of the thrust bearing and the surface of the thrust collar 12 of the crankshaft.

During running of the internal combustion engine, if vibration resulting from bending of the crankshaft increases, the surface of the thrust collar 12 of the crankshaft repeats the action of approaching and the action of separating while changing its tilt angle to the slide surface 81 of the half thrust bearing, or while undulating.

Figure 10A:
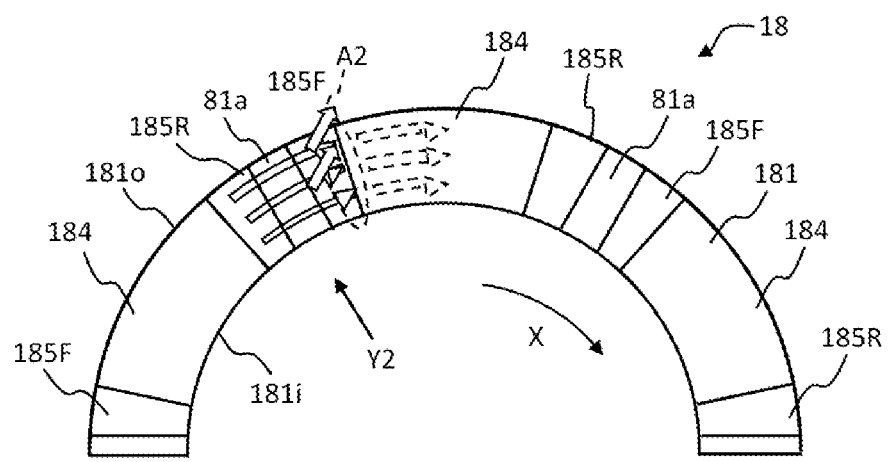
FIG. 10A is a view for explaining action of a half thrust bearing according to a prior art.
Figure 10B:
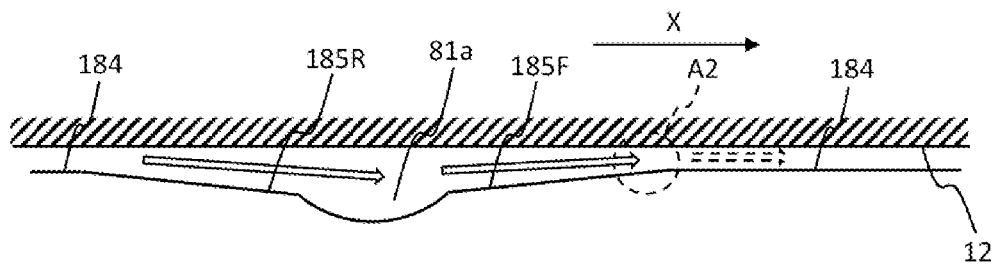
FIG. 10B is a view for explaining the action of the half thrust bearing according to a prior art.

Here, the configuration of a prior-art half thrust bearing 18 having a plurality of inclined surfaces and pad surfaces on a slide surface 181, and the action thereof are described by use of FIGS. 10A and 10B. FIG. 10A is a front view in which the slide surface side of the half thrust bearing 18 is seen, and FIG. 10B is a view seen from an arrow Y2 in FIG. 10A, where an arrow X indicates a rotation direction of the thrust collar 12, and a white arrow indicates the flow of oil.

The slide surface 181 of the prior-art half thrust bearing 18 includes a plurality of pad surfaces 184, a plurality of inclined surfaces 185F, 185R, and a plurality of oil grooves 81a. Each of the pad surfaces 184 is formed so that the axial thickness between the pad surface 184 and the back surface of the half thrust bearing 18 is fixed or constant. Each of the oil grooves 81a is formed between the pad surfaces 184 so as to radially extend from the center of the half thrust bearing 18. The plurality of inclined surfaces 185F, 185R include a first inclined surface 185F formed so that the axial thickness decreases toward the oil groove 81a from the circumferential end of the pad surface 184 on the backward side in a rotation direction X of the crankshaft, and a second inclined surface 185R formed so that the axial thickness decreases toward the oil groove 81a from the circumferential end of the pad surface 184 on the forward side in the rotation direction X of the crankshaft. The axial thickness of each of the first inclined surface 185F and the second inclined surface 185R is formed so as to be constant along the radial direction of the half thrust bearing. The circumferential length of each of the first inclined surface 185F and the second inclined surface 185R gradually increases from a radially inner end 181*i* of the half thrust bearing 18 toward an outer end 181*o* thereof. Each of the pad surface 184, the first inclined surface 185F, and the second inclined surface 185R is made flat. By this configuration, a wedged clearance which becomes gradually narrower toward the forward side in the rotation direction X of the thrust collar 12 is formed between the first inclined surface 185F and the surface of the thrust collar 12 (see FIG. 10B).

In the prior-art half thrust bearing 18, when the vibration resulting from the bending of the crankshaft increases during running of the internal combustion engine so that the surface of the thrust collar 12 of the crankshaft is close to the slide surface, the oil between the oil groove 81*a*, the first inclined surface 185F, and the second inclined surface 185R, and the surface of the thrust collar 12 flows toward the circumferential end side of the wedged clearance on the forward side in the rotation direction X between the first inclined surface 185F and the surface of the thrust collar 12 following the surface of the rotating thrust collar 12. This oil becomes high in pressure in response to a hydrodynamic action when flowing through the wedged clearance, and an oil film which has the maximum pressure in the vicinity of the circumferential end of the wedged clearance (in the vicinity of a dashed ellipse A2 in FIG. 10A and a dashed circle A2 in FIG. 10B) is formed.

However, in the prior-art half thrust bearing 18, the pressure of the oil film that becomes maximum in the vicinity of the circumferential end of the wedged clearance between the first inclined surface 185F and the second inclined surface 185R, and the surface of the thrust collar 12 (in the vicinity of the dashed ellipse A2 in FIG. 10A and the dashed circle A2 in FIG. 10B) has been insufficient, and the oil amount fed from the wedged clearance to the pad surface 184 has been also insufficient. Therefore, the slide surface 181 (the pad surface 184) of the half thrust bearing 18 easily comes into direct contact with the surface of the thrust collar 12 of the crankshaft, and it becomes easy for seizure to occur in the half thrust bearing 18.

The reasons thereof will be described below in detail.

When the oil flows through the wedged clearance between the first inclined surface 185F and the surface of the thrust collar 12, the oil receives a hydrodynamic action and at the same time, flows in the circumferential direction in the wedged clearance between the first inclined surface 185F and the surface of the thrust collar 12 following the surface of the rotating thrust collar 12 and therefore receives a centrifugal action.

As described above, in the prior-art half thrust bearing 18, the depth of the wedged clearance (the axial depth to the second inclined surface 185R from a virtual pad surface in which the pad surface 184 is extended above the second inclined surface 185R) is constant along the radial direction at any positions in the circumferential direction, and the circumferential length of the wedged clearance continuously increases from the radially inner end 181*i* of the half thrust bearing 18 toward the radially outer end 181*o*. That is to say, the sectional area (sectional area between the virtual pad surface and the first inclined surface) of the wedged clearance along the circumferential direction continuously increases from the radially inner end 181*i* toward the radially outer end 181*o*, and the oil passage resistance to the flow of oil running from the radially inner end 181*i* side toward the radially outer end 181*o* side in response to a centrifugal action is small. Thus, the oil flowing in the circumferential direction of the wedged clearance on the first inclined surface 185F easily flows toward the radially outer end 181*o* before reaching the circumferential end of the wedged clearance, and therefore easily flows out to the outside from the radially outer end 181*o* of the wedged clearance. When the amount of the oil flowing to the circumferential end of the wedged clearance is small, it is difficult for the pressure of the oil to become high, and the amount of the oil flowing from the circumferential end of the wedged clearance to a clearance between the pad surface 184 and the surface of the thrust collar 12 is smaller.

The present invention copes with such a problem of the prior art. One example of the configuration of the half thrust bearing according to the present invention is described below.

(Configuration of Half Thrust Bearing)

The configuration of the half thrust bearing 8 according to one embodiment of the present invention is illustrated in FIGS. 2 to 7. The half thrust bearing 8 is formed as a semi-annularly shaped flat plate by a bimetal obtained by bonding a thin bearing alloy layer to a steel back metal layer. The half thrust bearing 8 includes the slide surface 81 which is the surface of the bearing alloy layer and is located on the side for bearing the thrust collar 12, and a back surface 82 which is the surface of the back metal layer opposite to the side to which the bearing alloy layer is bonded. More specifically, the slide surface 81 includes the plurality of pad surfaces 84, a plurality of inclined surface portions 85F, 85R, and the plurality of oil grooves 81*a*. Note that the entire surface of the oil groove 81*a* may not be covered with the bearing alloy layer necessarily.

Figure 2:
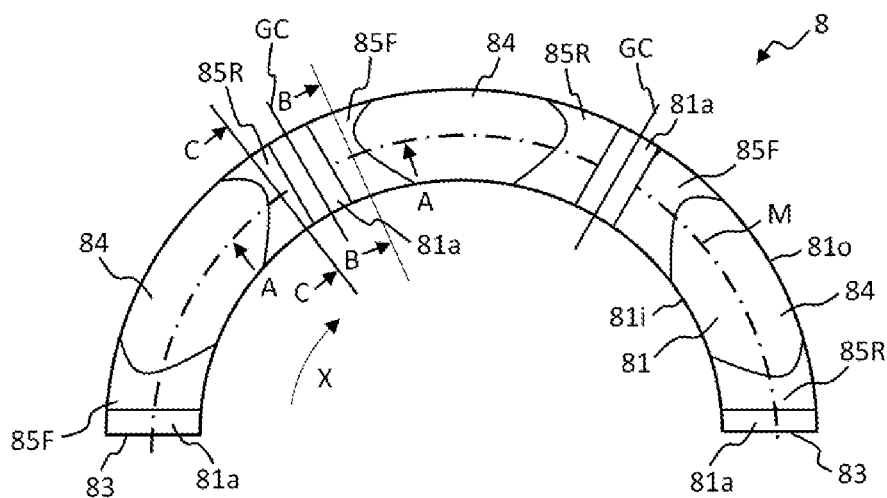
FIG. 2 is a front view of a half thrust bearing according to one embodiment of the present invention.
Figure 3:
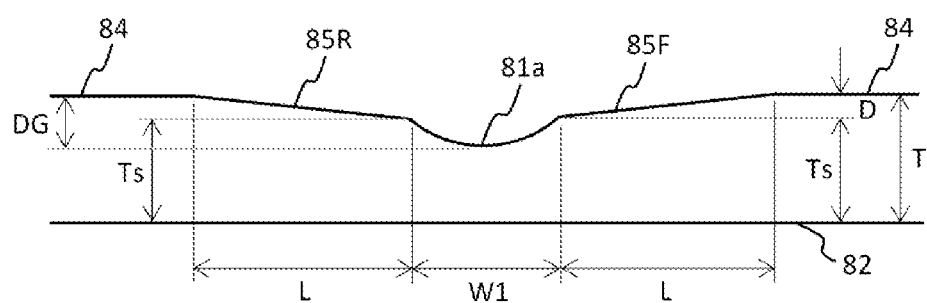
FIG. 3 is a sectional view of the half thrust bearing in FIG. 2 along a center line A-A in a radial direction thereof.
Figure 4:
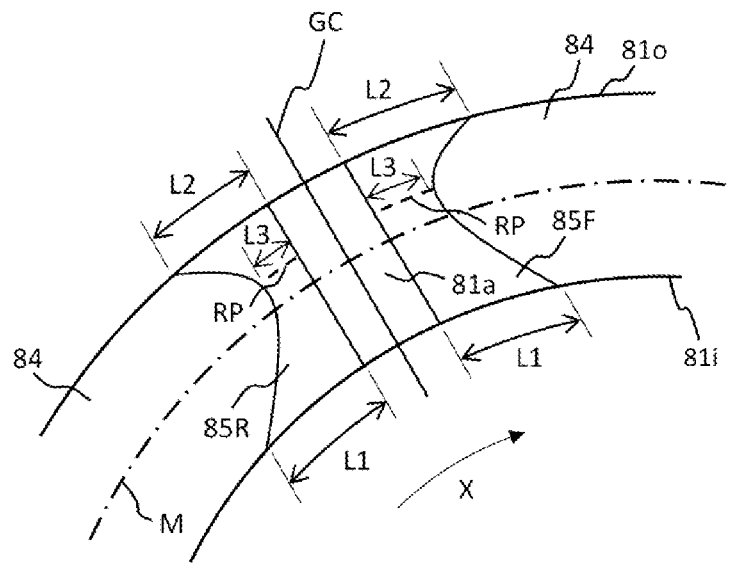
FIG. 4 is an enlarged view illustrating a vicinity of an oil groove of the half thrust bearing in FIG. 2.
Figure 5:
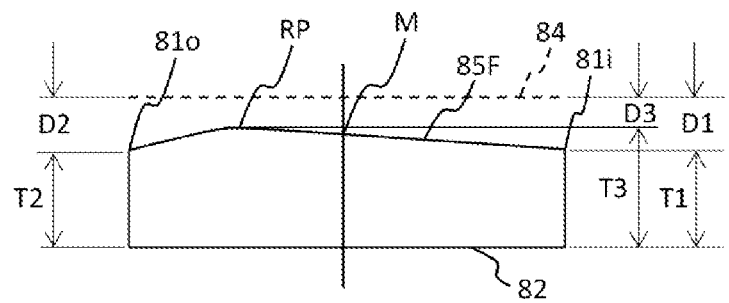
FIG. 5 is a sectional view of the half thrust bearing in FIG. 2 along a line B-B.
Figure 6:
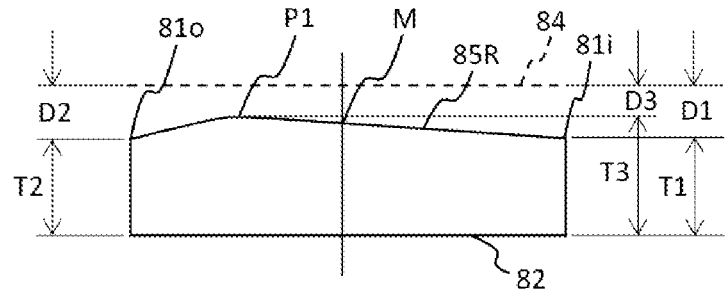
FIG. 6 is a sectional view of the half thrust bearing in FIG. 2 along a line C-C.

FIG. 2 is a front view of the half thrust bearing 8 according to one embodiment of the present invention. FIG. 3 illustrates a section of the half thrust bearing 8 in FIG. 2 along the center line A-A in the radial direction. FIG. 4 is an enlarged view illustrating the vicinity of the oil groove 81*a* of the half thrust bearing in FIG. 2. FIG. 5 illustrates a section of the half thrust bearing in FIG. 2 along the line B-B. FIG. 6 illustrates a section of the half thrust bearing in FIG. 2 along the line C-C. Note that an arrow X in FIG. 2 indicates the rotation direction of the crankshaft (or the surface of the thrust collar 12).

In each of the pad surfaces 84, the axial thickness T between the pad surface 84 and the back surface 82 is constant, i.e., the pad surface 84 is parallel to the back surface 82. Each of the pad surfaces 84 is substantially partly annularly shaped. Although the three pad surfaces 84 are arranged apart in the circumferential direction in the slide surface 81 of the half thrust bearing 8 in the present embodiment, the number of the pad surfaces 84 may be more than three, and three to five pad surfaces are generally formed.

Each of the plurality of oil grooves 81*a* is arranged between the pad surfaces 84 so as to radially (i.e., diametrically) extend from a radially inner end 81*i* to a radially outer end 81*o* of the slide surface 81. In the present embodiment, in addition to the two oil grooves 81*a* between the pad surfaces 84, partial oil grooves 81*a* are formed adjacent to both circumferential end faces 83, 83 of the half thrust bearing 8 so that the oil groove 81*a* is formed in each abutment portion formed when the two half thrust bearings 18 are combined.

As specific dimensions of the oil groove 81*a*, in the case of using it for a crankshaft of a small internal combustion engine such as a passenger vehicle (the diameter of a journal portion is about 30 to 100 mm), a groove width W1 of the oil groove 81*a* is 2 to 7 mm, a depth DG of the oil groove 81*a* may be 0.2 to 1 mm, and in the present embodiment, the section thereof along the circumferential direction is substantially annularly shaped (see FIG. 3). Here, the depth DG of the oil groove 81*a* is defined as the axial length of the half thrust bearing 8 from the pad surface 84 to the deepest portion of the oil groove 81*a*. Note that the above-described dimensions are merely illustrative, and the respective dimensions are not limited to these ranges.

An inclined surface portion is arranged between the pad surface 84 and the oil groove 81*a*. In the circumferential direction, the inclined surface portion includes a first inclined surface 85F formed to decrease in axial thickness toward the oil groove 81*a* from the circumferential end of the pad surface 84 located on the backward side in the rotation direction X of the crankshaft and to have a minimum thickness Ts at a position adjacent to the oil groove 81*a*, and a second inclined surface 85R formed to decrease in axial thickness toward the oil groove 81*a* from the circumferential end of the pad surface 84 located on the forward side in the rotation direction X of the crankshaft and to have the minimum thickness Ts at a position adjacent to the oil groove 81*a*. As described later, in the present embodiment, each of the first inclined surfaces 85F and the second inclined surfaces 85R is formed as a curved surface.

It will be appreciated that the arrow X indicates the rotation direction of the crankshaft (or the thrust collar 12) in FIG. 2, however, the rotation direction X of the thrust collar 12 relative to the half thrust bearings 8, 8 arranged on the left accept seat 6 in the paper including FIG. 8 is opposite to the rotation direction X of the thrust collar 12 relative to the half thrust bearings 8, 8 arranged on the right accept seat 6 in that paper. In the half thrust bearing 8 arranged on the side where the rotation direction is opposite (leftward rotation) to that of the thrust collar 12 illustrated in FIGS. 2 and 7, the first inclined surface 85F in FIGS. 2 and 7 constitutes the second inclined surface 85R, and the second inclined surface 85R in FIGS. 2 and 7 constitutes the first inclined surface 85F.

When seen from the axial direction (i.e., seen from a direction perpendicular to the paper of FIG. 4), the first inclined surface 85F and the second inclined surface 85R each have a circumferential length L between a position adjacent to the oil groove 81*a* and a position adjacent to the pad surface 84. As illustrated in FIG. 4, the circumferential length L of each of the first inclined surface 85F and the second inclined surface 85R varies along the radial direction of the half thrust bearing 8 and is not constant over the radial direction. Moreover, the first inclined surface 85F and the second inclined surface 85R each have a ridge portion RP extending in the circumferential direction as indicated by a broken line in FIG. 4 at a radial position that has a minimum circumferential length L3, and the ridge portion RP of each of a plurality of the first inclined surfaces 85F and the second inclined surfaces 85R is formed at the same radial position of the half thrust bearing 8. The circumferential length L of each of the first inclined surfaces 85F and the second inclined surfaces 85R successively increases from the ridge portion RP toward the radially inner end 81*i* and successively increases from the ridge portion RP toward the radially outer end 81*o*. The ridge portion RP is located on a radially outer side of a center line M of the half thrust bearing 8 in the radial direction.

A circumferential length L1 of each of the first inclined surfaces 85F and the second inclined surfaces 85R at the radially inner end 81*i* is larger than a circumferential length L2 at the radially outer end 81*o* in the present example, however, without being limited thereto, the circumferential length L1 of each of the first inclined surfaces 85F and the second inclined surfaces 85R at the radially inner end 81*i* may be smaller than the circumferential length L2 at the radially outer end 81*o*, or the circumferential length L1 of each of the first inclined surfaces 85F and the second inclined surfaces 85R at the radially inner end 81*i* may be the same as the circumferential length L2 at the radially outer end 81*o*. Moreover, the circumferential length L of each of the first inclined surfaces 85F and the second inclined surfaces 85R may become gradually larger while repeating slight increase and decrease from the ridge portion RP toward the radially inner end 81*i*, and may also become gradually larger while repeating slight increase and decrease from the ridge portion RP toward the radially outer end 81*o*.

The axial thickness of the first inclined surface 85F defined as the axial length from the back surface of the half thrust bearing 8, and the depth of the first inclined surface 85F defined as the axial length from the pad surface 84 are described below with reference to FIG. 5.

FIG. 5 illustrates a section (the B-B section in FIG. 2) of the half thrust bearing 8 passing through the first inclined surface 85F in the radial direction. The axial thickness of the first inclined surface 85F is maximum (T3) at the ridge portion RP, successively decreases (T1) from the ridge portion RP toward the radially inner end 81*i*, and successively decreases from the ridge portion RP toward the radially outer end 81*o*. In other words, the axial depth of the first inclined surface 85F is minimum (D3) at the ridge portion RP, successively increases (D1) from the ridge portion RP toward the radially inner end 81*i*, and successively increases (D2) from the ridge portion RP toward the radially outer end 81*o*.

In the same manner in relation to the second inclined surface 85R, the axial thickness of the second inclined surface 85R is maximum (T3) at the ridge portion RP, successively decreases (T1) from the ridge portion RP toward the radially inner end 81*i*, and successively decreases from the ridge portion RP toward the radially outer end 81*o*. In other words, the axial depth of the second inclined surface 85R is minimum (D3) at the ridge portion RP, successively increases (D1) from the ridge portion RP toward the radially inner end 81*i*, and successively increases (D2) from the ridge portion RP toward the radially outer end 81*o* (see FIG. 6).

The axial depth D1 of each of the first inclined surfaces 85F and the second inclined surfaces 85R at the radially inner end 81*i* is the same as the axial depth D2 at the radially outer end 81*o* in the present example, however, without being limited thereto, the axial depth D1 of each of the first inclined surfaces 85F and the second inclined surfaces 85R at the radially inner end 81*i* may be larger than the axial depth D2 at the radially outer end 81*o*, or the axial depth D1 of each of the first inclined surfaces 85F and the second inclined surfaces 85R at the radially inner end 81*i* may be smaller than the axial depth D2 at the radially outer end 81*o*. Moreover, the depth of the first inclined surface 85F and the axial depth of the second inclined surface may become gradually larger while repeating slight increase and decrease from the ridge portion RP toward the radially inner end 81*i*, and in the same manner, may become gradually larger while repeating slight increase and decrease from the ridge portion RP toward the radially outer end 81*o*.

The axial depth D1 of each of the first inclined surfaces 85F and the second inclined surfaces 85R at a position adjacent to the oil groove 81*a* and the radially inner end 81*i*, and the axial depth D2 of each of the first inclined surfaces 85F and the second inclined surfaces 85R at a position adjacent to the oil groove 81a and the radially outer end 81o may be 5 to 30 μm. Moreover, the axial depth D3 of the ridge portion RP of each of the first inclined surfaces 85F and the second inclined surfaces 85R at a position adjacent to the oil groove 81a may be 50% to 90% of the axial depth D1 of each of the first inclined surfaces 85F and the second inclined surfaces 85R at a position adjacent to the oil groove 81a and the radially inner end 81i.

Furthermore, the axial depth D2 of each of the first inclined surfaces 85F and the second inclined surfaces 85R at a position adjacent to the oil groove 81a and the radially outer end 81o may be 80% to 120% of the axial depth D1 of each of the first inclined surfaces 85F and the second inclined surfaces 85R at a position adjacent to the oil groove 81a and the radially inner end 81i.

The circumferential length L1 of each of the first inclined surfaces 85F and the second inclined surfaces 85R at the radially inner end 81i may be a circumferential length corresponding to a circumferential angle of 5° to 25° of the half thrust bearing 8, and the circumferential length L3 of the ridge portion RP of each of the first inclined surfaces 85F and the second inclined surfaces 85R may be 50% to 90% of the circumferential length L1 at the radially inner end 81i. The circumferential length L2 of each of the first inclined surfaces 85F and the second inclined surfaces 85R at the radially outer end 81o may be 80% to 120% of the circumferential length L1 at the radially inner end 81i.

Note that the above-described dimensions are merely illustrative, and the respective dimensions are not limited to these ranges.

Further, the first inclined surface 85F and the second inclined surface 85R are formed symmetrically with respect to a center line GC of the oil groove 81a in its width direction in the present example, but may otherwise be asymmetrical with respect to the center line GC of the oil groove 81a in the width direction.

Figure 9A:
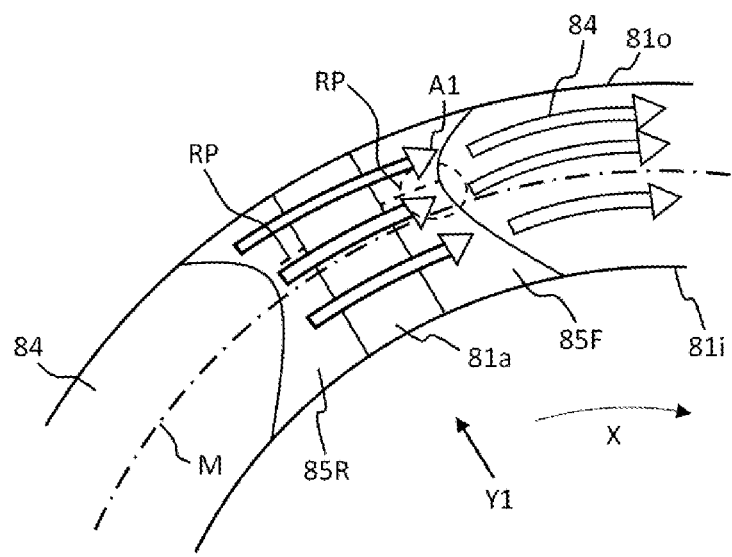
FIG. 9A is a view for explaining action of the half thrust bearing according to the present invention.
Figure 9B:
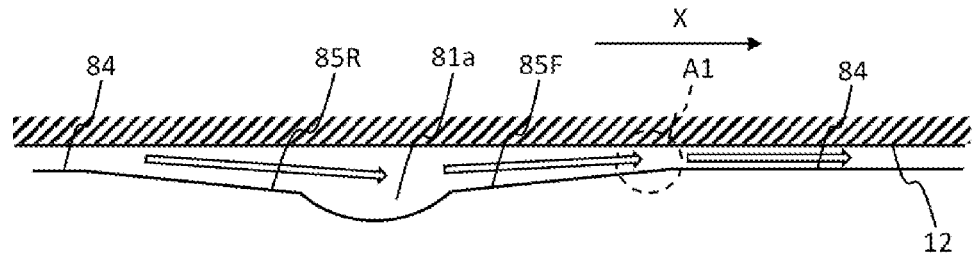
FIG. 9B is a view for explaining describing the action of the half thrust bearing according to the present invention.

The reasons that it is difficult for seizure to occur in the half thrust bearing 8 of the present invention will be described below by use of FIGS. 9A and 9B. FIG. 9A is an enlarged view illustrating the vicinity of the oil groove 81a of the half thrust bearing 8, and FIG. 9B is a view seen from the arrow Y1 in FIG. 9A, where an arrow X indicates the rotation direction of the thrust collar 12, and a white arrow indicates the flow of oil.

As described above, if vibration resulting from bending of the crankshaft increases during running of the internal combustion engine, and the surface of the thrust collar 12 of the crankshaft approaches the slide surface, oil between the oil groove 81a, the first inclined surface 85F, and the second inclined surface 85R, and the surface of the thrust collar 12 flows toward the circumferential end side of the wedged clearance on the forward side in the rotation direction between the first inclined surface 85F and the surface of the thrust collar 12 following the surface of the rotating thrust collar 12. At that time, the oil tends to flow toward the radially outer end 8o due to a centrifugal action.

(Action by the Radially Inner Region of the Ridge Portion)

According to the present invention, the first inclined surface 85F has the ridge portion RP located on a radially outer side with respect to the center line M of the half thrust bearing 8 in the radial direction and having a minimum circumferential length, and an axial depth D of the first inclined surface 85F is minimum at the ridge portion RP in the radial direction of the half thrust bearing 8, and successively increases from the ridge portion RP toward the radially inner end 81i. Therefore, in a region between the ridge portion RP of the first inclined surface 85F and the radially inner end 81i, a section (sectional area) of the wedged clearance in the circumferential direction between the first inclined surface 85F and the surface of the rotating thrust collar 12 changes so as to successively decrease from the radially inner end 81i toward the ridge portion RP along the radial direction. Thus, the oil passage resistance to the flow of oil from the radially inner end 81i side toward the radially outer end 81o side due to a centrifugal action is great.

Such change in sectional area of the wedged clearance (in the radial direction) restrains the oil in the wedged clearance between a region of the first inclined surface 85F between the ridge portion RP and the radially inner end 81i, and the surface of the rotating thrust collar 12 from flowing toward the radially outer end 81o side even if receiving a centrifugal action, so that the amount of oil flowing toward the circumferential end side of the wedged clearance on the forward side in the rotation direction becomes large. Accordingly, a large amount of oil receives a hydrodynamic action in the wedged clearance in the vicinity of the circumferential end of the ridge portion RP (a dashed circle A1 in FIG. 9A), and the pressure of an oil film formed in the vicinity of the circumferential end of the wedged clearance becomes higher than heretofore. The large amount of oil further flows to a clearance between the pad surface 84 and the surface of the thrust collar 12, so that it is difficult for contact between the pad surface 84 and the surface of the thrust collar 12 to occur.

(Action by the Radially Outer Region of the Ridge Portion)

A region between the ridge portion RP of the first inclined surface 85F and the radially outer end 81o contributes to a rise in pressure of the oil film in the wedged clearance in the vicinity of the circumferential end of the ridge portion RP (the dashed circle A1) described above. Specifically, while the pressure of the oil film becomes highest in a range including the ridge portion RP and a region on the radially inner end 81i side of the first inclined surface 85F adjacent to the ridge portion RP as illustrated in FIG. 9A, a sufficient rise of the pressure of the oil film is achieved by the oil film being supported (or receiving a hydrodynamic action) also in a region between the ridge portion RP and the radially outer end 81o of the first inclined surface 85F.

For example, in contrast to the present example, if the ridge portion RP of the first inclined surface 85F is formed at the radially outer end 81o of the slide surface 81, a larger amount of oil flows to the wedged clearance in the vicinity of the circumferential end of the ridge portion RP. However, since there is no surface necessary to provide a hydrodynamic action to oil (to support the oil film) on a radially outer side from that ridge portion RP, the pressure of the oil film at the position of the ridge portion RP becomes zero, the pressure of the oil film does not sufficiently rise even at a position adjacent to the ridge portion RP, and it becomes easy for the pad surface 84 and the surface of the thrust collar 12 of the crankshaft to come into direct contact with each other.

As above, the half thrust bearing according to the present invention has been described with the specific examples. In the above description, although the example in which a pair of half thrust bearings are combined into an annular shape to be configured to receive an axial force of a crankshaft of an internal combustion engine is used, the half thrust bearing according to the present invention may be used alone for receiving an axial force of a crankshaft of an internal combustion engine.

Furthermore, the half thrust bearing according to the present invention may be formed of a bimetal consisting of a back metal layer and a bearing alloy as described above, or may be formed of only a bearing alloy without a back metal layer. In this case, it will be appreciated that the surface which contacts the surface of the thrust collar 12 serves as a slide surface, and the opposite surface serves as a back surface.

Still further, the half thrust bearing according to the present invention is not limited to a semi-annular shape in which the circumferential length corresponds to a circumferential angle of 180°, and may have a substantially semi-annular shape in which the circumferential length is slightly smaller than 180° of the circumferential angle. Moreover, in the half thrust bearing according to the present invention, the oil groove adjacent to both circumferential end faces 83 may be changed to a thrust relief of an inclined-surface shape, or the configuration of the oil groove adjacent to the circumferential end face 83 does not need to be provided. A protrusion configuration protruding to the radially outer side from the outer circumferential surface of the half thrust bearing may be provided for preventing wrong assembling of the half thrust bearing and for stopping the rotation.

The invention claimed is:

1. A semi-annularly shaped half thrust bearing for receiving axial force of a crankshaft of an internal combustion engine, the half thrust bearing comprising a slide surface for receiving the axial force and a back surface on an opposite side thereto, and defining an axial direction, a circumferential direction and a radial direction, wherein the slide surface comprises:
   at least two oil grooves each radially extending from a radially inner end to a radially outer end of the slide surface with a constant width;
   a plurality of pad surfaces located on both sides of each oil groove in the circumferential direction, and having an axial thickness from the back surface to the pad surface that is constant;
   at least two first inclined surfaces, each first inclined surface being formed between the oil groove and the pad surface so as to be located on a forward side of the oil groove in a rotation direction of the crankshaft, and having an axial thickness from the back surface to the first inclined surface that is smaller in the circumferential direction from a pad surface side toward an oil groove side; and
   at least two second inclined surfaces, each second inclined surface being formed between the oil groove and the pad surface so as to be located on a backward side of the oil groove in the rotation direction of the crankshaft, and having an axial thickness from the back surface to the second inclined surface that is smaller in the circumferential direction from the pad surface side toward the oil groove side, wherein
   each of the first inclined surfaces and the second inclined surfaces has a circumferential length which varies along the radial direction, and comprises a ridge portion which extends circumferentially at a radial position where the circumferential length is minimum, wherein the circumferential length of each of the first inclined surfaces and the second inclined surfaces is formed so as to become greater from the ridge portion toward the radially inner end along the radial direction and become greater from the ridge portion toward the radially outer end along the radial direction,
   the axial thickness of each of the first inclined surfaces and the second inclined surfaces is formed so as to be maximum at the ridge portion in the radial direction, to become smaller from the ridge portion toward the radially inner end, and to become smaller from the ridge portion toward the radially outer end, and
   the ridge portions of the first inclined surface and the second inclined surface located on both sides of each oil groove in the circumferential direction are formed at the same radial position on an outer side relative to a center line of the half thrust bearing in the radial direction.

2. The half thrust bearing according to claim 1, wherein, in each of the first inclined surfaces and the second inclined surfaces, a circumferential length of the ridge portion is 50% to 90% of a circumferential length at the radially inner end.

3. The half thrust bearing according to claim 2, wherein the first inclined surface and the second inclined surface on both sides of the oil groove in the circumferential direction are formed symmetrically with respect to a center line of the oil groove in a width direction.

4. The half thrust bearing according to claim 1, wherein, in each of the first inclined surfaces and the second inclined surfaces, an axial depth from the pad surface to the ridge portion at a position adjacent to the oil groove is 50% to 90% of an axial depth from the pad surface to the radially inner end at a position adjacent to the oil groove.

5. The half thrust bearing according to claim 4, wherein the first inclined surface and the second inclined surface on both sides of the oil groove in the circumferential direction are formed symmetrically with respect to a center line of the oil groove in a width direction.

6. The half thrust bearing according to claim 1, wherein the first inclined surface and the second inclined surface on both sides of the oil groove in the circumferential direction are formed symmetrically with respect to a center line of the oil groove in a width direction.

\* \* \* \* \*